Sept. 23, 1941.  H. Z. GORA  2,256,773
CUTTING MECHANISM
Filed Aug. 2, 1940  5 Sheets-Sheet 2

Fig. 1a.

Inventor
Henry Z. Gora
By Cameron, Kerkam + Sutton
Attorneys

Fig. 2.

Sept. 23, 1941.   H. Z. GORA   2,256,773
CUTTING MECHANISM
Filed Aug. 2, 1940   5 Sheets-Sheet 5

Fig. 4.

Inventor
Henry Z. Gora.
By Cameron Kerkam + Sutton
Attorneys

Patented Sept. 23, 1941

2,256,773

UNITED STATES PATENT OFFICE 2,256,773

CUTTING MECHANISM

Henry Z. Gora, Bridgeport, Conn., assignor to Jenkins Bros., New York, N. Y., a corporation of New Jersey Application August 2, 1940, Serial No. 349,553

15 Claims. (Cl. 164—61)

This invention relates to cutting mechanism, and more particularly to mechanism for subdividing material along angularly directed lines. While the invention will be exemplified by an embodiment particularly constructed for the severing of sheets of molded rubber valve stems as they come from the press into individual stems, it is to be expressly understood that the invention is of wider utility, as will be apparent to those skilled in the art, and therefore the illustrated and described embodiment is to be taken by way of example only.

In the molding of rubber valve stems having flaps integral with the stem body, it is customary to form a plurality of the molded units simultaneously by means of a gang mold. Any suitable number of stems may be formed at one time, depending upon the size of the press, the number of mold cavities used in the molding apparatus determining the size of the sheet which is formed at each molding operation. Although the flaps of each stem are to be circular in form some of the molded material is squeezed out of the mold cavities with the result that the flaps are more or less united into a continuous sheet as they come from the molds. These sheets must then be cut along right angularly related lines into the individual stems, after which each flap is subjected to a trimming operation to remove excess material from the periphery of the circular flap. The present invention is concerned with mechanism for severing these sheets of stems as they come from the press into the individual stems as a preliminary to the trimming operation. But while possessing particular utility in the service just referred to, the invention may be embodied in apparatus for severing other material along angularly directed lines, and as will be apparent from the description hereinafter contained, the lines of severance need not be at right angles, but may be along any suitably selected angularly related lines, depending upon what is the material to be severed.

It is an object of this invention to provide a device of the type characterized which is automatic in character, assuring that the material to be operated upon shall first be cut in one direction and then without the intervention of an operator moved into suitable position and cut in an angularly related direction.

Another object of this invention is to provide a device of the type characterized which will assure the discontinuance of operation of the machine if the material to be operated upon is not moved into the proper angularly related position in preparation for the second cutting operation.

Another object of this invention is to provide a device of the type characterized which performs the two cutting operations on forward and return strokes to conserve time and improve the efficiency of the machine.

Another object of this invention is to provide a device of the type characterized which is easy to control and which therefore may be satisfactorily used by relatively unskilled labor.

Another object of this invention is to provide a device of the type characterized which employs automatically operated control mechanism for regulating the relative movement of the parts so as to assure against jars, sudden changes of speed, and the like.

Another object of this invention is to provide a device of the type characterized which employs relatively simple but automatically operating devices for assuring the desired sequence of operation.

Another object of this invention is to provide a device of the type characterized which is simple and compact in structure and certain and efficient in operation.

Other objects of the invention will appear as the description thereof proceeds.

The invention is capable of receiving a variety of mechanical expressions one of which is illustrated on the accompanying drawings, but it is to be expressly understood that the drawings are for purposes of illustration only, and are not to be construed as a definition of the limits of the invention, reference being had to the appended claims for that purpose.

Referring in detail to the drawings, wherein the same reference characters are employed to designate corresponding parts in the several figures.

In the form shown the machine includes a frame of any suitable size and construction, here shown as composed of uprights 10 adapted to be mounted on or secured to any suitable foundation, and united by suitable longitudinal members 11 and 12, transverse members 13 and 14 and bracing members 15 and 16.

At a suitable point intermediate the length of the machine the frame is provided with uprights 17 united by a transversely extending horizontal member 18 in which is supported, in any suitable way, a gang of cutting elements. Any suitable number of cutting elements may be employed, depending upon the number of parts into which the sheet or other material is to be severed. Assuming for example that one hundred forty-four rubber valve stems are molded simultaneously in mold cavities arranged in a square, twelve to a side, eleven cutting elements for severing the sheet into twelve strips and then cutting each strip into twelve units would be employed. These cutting units may be of any suitable form and construction, being illustrated as in the form of rotatable knives 20 mounted on pins 21 in the bifurcated ends of blocks 22 suspended or otherwise properly secured in slots or apertures 23 extending through said horizontal member 18. As illustrated each block 22 is provided with a stem 24 having a threaded extension, and nuts 25 and locked nuts 26 secure said blocks 22 adjustably in the slots or recesses 23 so that the cutting edges of the rotatable knives 20 may be adjusted as required to operate in a suitable plane.

Suitably supported in the end members 13 of the frame are a pair of rods 30 which extend the full length of the frame. Slidably mounted on said rods 30 is a carriage 31 having sleeve portions 32 of any suitable construction for sliding on the rods 30. Carriage 31 is also suitably formed to provide centrally thereof a vertically extending bearing sleeve 33 which receives the downwardly extending spindle 34 of a rotatable table 35 on which the material to be cut up is disposed. Carriage 31 is moved back and forth along the rods 30 by any suitable mechanism, preferably a hydraulic ram. As shown a hydraulic cylinder 36 is suitably mounted on the frame and has a piston rod 37 suitably connected to the carriage 31 at 38. Within the cylinder 36 is disposed a piston 39, and the opposite ends of said cylinder 36 are provided with suitable conduits 40 and 41 leading to suitable valve mechanism hereinafter referred to, so that at proper times the motive fluid may be introduced first into one end and then into the other end of said cylinder to reciprocate the carriage 31 on its ways 30 from one end of the frame to the other and then return the carriage along its ways to the first end of the frame.

Figure 4:
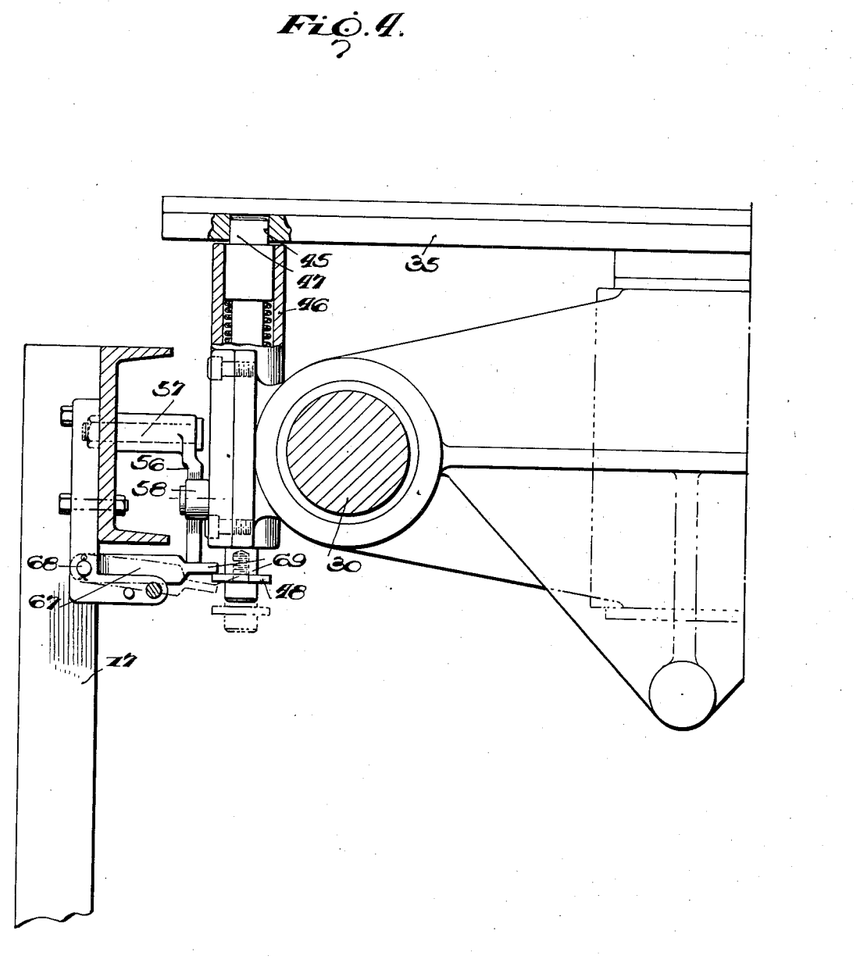
Fig. 4 is a detailed view of a part of Fig. 2.

Means are provided for preventing rotation of table 35 during movement of the carriage 31 under the knives 20. As shown, the table is provided at its underside with a suitable number of apertures 45 (Fig. 4) and reciprocatingly mounted in the carriage 31, as by means of a sleeve 46 is a pin 47 whose upper end is adapted to enter an aperture 45 and lock the table against rotation. Cylinder 46 contains a suitable spring normally urging pin 45 upwardly into its table-locking position. The lower end of pin 47 is provided with a flange 48 for co-operation with releasing mechanism to be described hereinafter.

Means are provided for rotating the table through a predetermined arc as the table reaches one extremity of its movement with the carriage 31. The extent to which the table is rotated will of course depend upon the angular relation desired between the two cuts, and this as heretofore explained may be any suitable angle. But in severing sheets of molded valve stems into their component units the two cuts are desired at right angles, and therefore the table is rotated through 90° when the carriage reaches the end of its stroke. Any suitable mechanism for rotating the table may be used. As shown, the table is provided on its underface with four symmetrically arranged pins 50, and pivotally mounted on end member 13 at 51 is an arm 52 having a bifurcated end 53, arm 52 being held in any suitable way against a stop, as by a spring, so that the slot in its end is in the path of traverse of a pin 50. Therefore, as the carriage approaches the end of its stroke, toward the right as viewed in Fig. 3, and assuming that the locking pin 47 has been withdrawn, a pin 50 engages the bifurcated end 53 of arm 52, and the table is positively moved through 90° by the thrust exerted by said arm on said pin as the table moves forwardly with the carriage, arm 52 pivoting to the extent necessary about its pivot 51.

Locking pin 47 is withdrawn from its aperture 45 before the means for rotating the table comes into operation. Any suitable means may be employed to this end. As shown, pin 47 has a laterally extending lug 55 which carries a roller 55', said lug projecting through a slot in the side of sleeve 46. Pivotally mounted on the adjacent longitudinal member 11 of the frame at 57 is an arm 56 which may be moved by roller 55' against a stop 58, whereupon said arm becomes an inclined cam element. As the carriage 31 approaches the right-hand limit of its stroke as viewed in Fig. 1, roller 55' engages the cam element 56 and is moved downwardly thereby (see dotted position in Fig. 4) so as to withdraw the extremity of pin 47 from its aperture 45.

Figure 1:
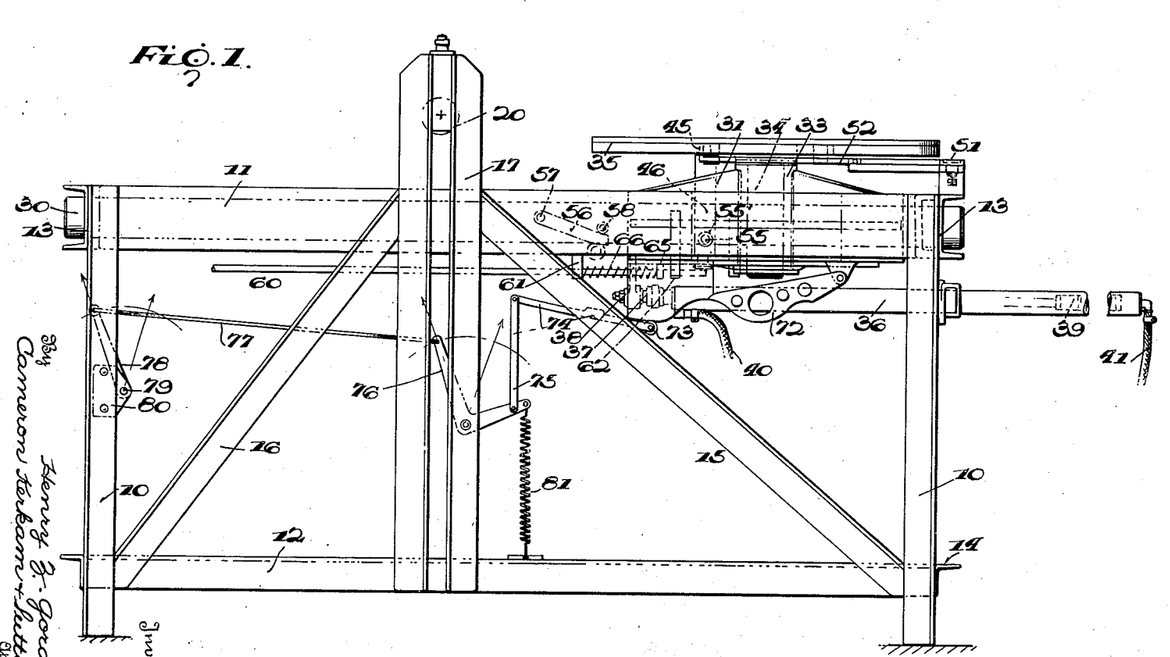
Fig. 1 is an elevation of an embodiment of the present invention.
Figure 3:
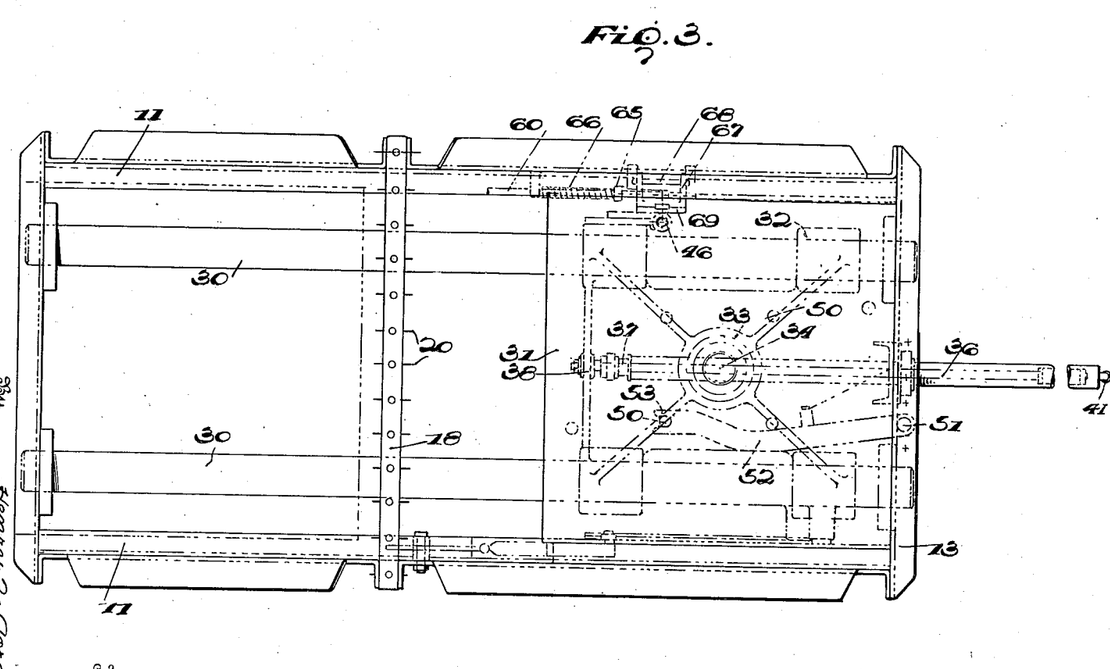
Fig. 3 is a plan view of the embodiment of Fig. 1 with the table removed.

Any suitable means are provided for reversing the direction of movement of the carriage when it reaches the end of its forward stroke, at the right-hand end of the machine as viewed in Figs. 1 and 3, said means also by preference being effective to prevent the carriage being started on its return stroke if the table 35 has not been suitably rotated so as to position an aperture 45 in alignment with the locking pin 47, as such lack of alignment would mean that the table had not been rotated 90° and the cut effected by the knives 20 during the return stroke would not be at right angles to the first cut, whereby the material would be injured or destroyed not only through lack of proper relationship to the knives but also because of the danger that the table might move while the knives were performing their cutting operation.

As shown, the initiation of the operation of the machine and the control of the return stroke is effected by means of a control lever 63 pivoted at 64 on valve box 59 containing the valve mechanism by which the flow of motive fluid to one or the other end of cylinder 36 is controlled. Operatively connected to said control lever is a relatively long rod 60 which is slidably mounted in suitable brackets 61 and 62 depending from a longitudinal member 11. Mounted on said rod 60 is a collar 65, and interposed between collar 65 and bracket 61 is a coil spring 66 which normally urges rod 60 to the right as viewed in Fig. 1. To initiate the operation of the machine, lever 63 is swung from its central or neutral position to its left-hand position as viewed in Fig. 1a, moving rod 60 to the left. Means are provided for retaining rod 60 in this leftward position against the tension of the spring 65. As shown, a rectangular latch member 67 is pivotally mounted in any suitable way, as by a pin 68 mounted in brackets on the longitudinal member 11, and is adapted to drop by gravity into the path of the end of the rod 60 preventing its return toward the right. Any suitable stop is provided for retaining the latch in the lower position to which it falls by gravity, and in this position, its longitudinally extending portion 69 lies above the path of movement of the flange 48 on the pin 47 when the latter has been depressed by the coaction of its roller 55' with the cam 56.

If after rotation of the table 35 through 90° an aperture 45 is aligned with the pin 47, the spring in the cylinder 46 elevates the pin 47 to project the end of the pin into the aperture 45 and the flange 48 on said pin 47 will engage the longitudinal portion 69 of the latch 67 and lift it from its position opposite the end of rod 60, so that rod 60 is moved to the right as viewed in Figs. 1 and 3 by its coil spring 66. However, if the pin 47 is held depressed by its end engaging the underside of the table 35, flange 48 cannot lift the latch 67 from the end of the rod 60, and hence rod 60 is not operated by spring 66 to reverse the travel of the table.

Figure 1A:
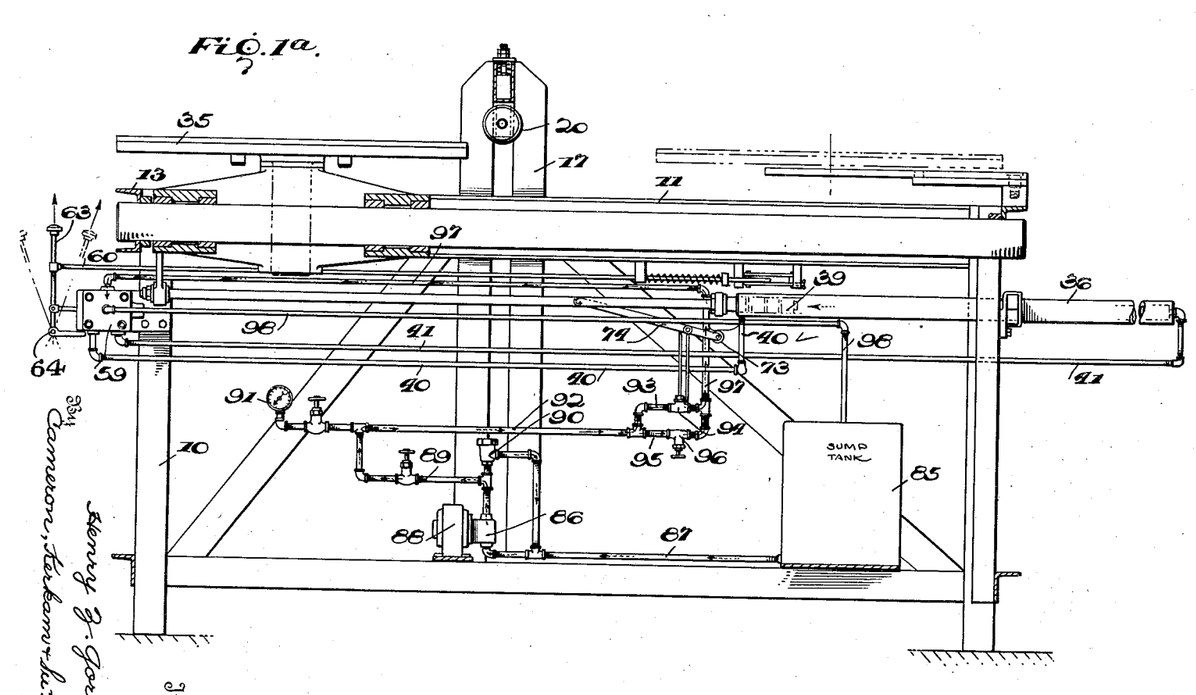
Fig. 1a is an elevation of the embodiment of Fig. 1 showing a suitable control mechanism and hydraulic system for use therewith and is to be taken as an amplification of Fig. 1.
Figure 2:
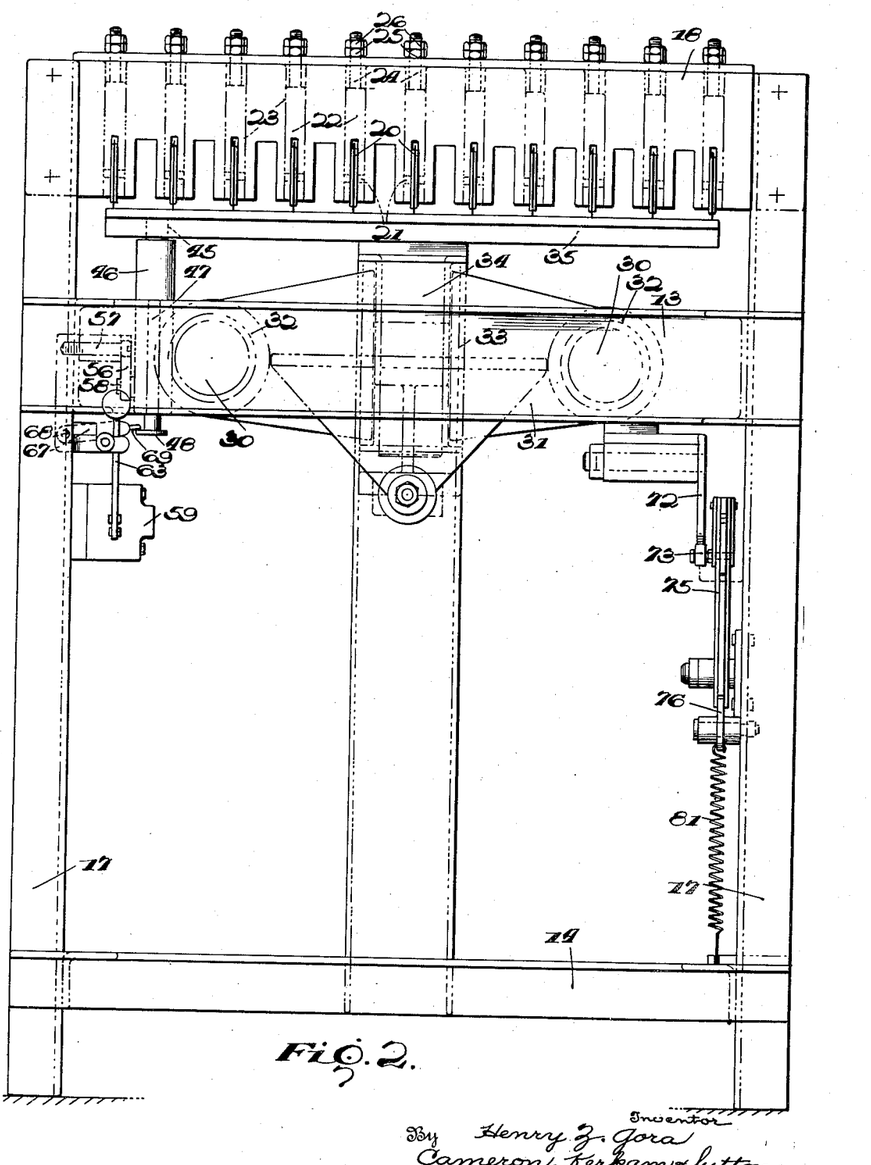
Fig. 2 is an end elevation of the embodiment of Fig. 1 on an enlarged scale.

Movement of the rod 60 to the right as viewed in Figs. 1 and 1a, moves the lever 63 from its position at the left in Fig. 1a to its position at the right as viewed in Fig. 1a and this movement of the control lever 63 from its left to its right-hand position operates the valve mechanism before referred to for admitting the hydraulic fluid to the opposite end of the cylinder 36 whereby the carriage is moved on its return stroke.

Means are preferably provided for controlling the movement of the carriage along its ways such that its speed of movement will vary in accordance with that which is most desirable for the work to be done. Thus it is desirable that as the table approaches either limit of its stroke, the speed of movement of the carriage should be progressively decreased so as to avoid the shocks and jars due to sudden impact with the ends of the frame or from otherwise suddenly stopping the travel of the carriage. Furthermore, the speed of the carriage as it approaches the cutting position may be desirably different from the speed of the carriage while the knives are severing the material, or the speed of the carriage while the table is being rotated may be desirably different than at other positions of the stroke. The character of speed variations will obviously vary with the character of work to be done. In the form shown the carriage is provided with a depending cam plate 72 secured in any suitable way to the underside of the carriage, and co-operating with the edge of said cam plate is a follower 73 mounted on a pivoted lever 74 which is connected through any suitable linkage 75, 76, 77, with a control lever 78 pivoted at 79 in or on a control box 80 containing suitable mechanism, not shown, for throttling the throw of liquid to the cylinder 36. Cam follower 73 is held in contact with the cam 72 by coil spring 81. As before indicated, the edge of cam 72 is so shaped that the control lever 78 is moved properly for varying the throttling mechanism to predetermine the speed of movement of the carriage 31 at different points along its stroke.

Referring to Fig. 1a, a suitable hydraulic system is there shown for supplying fluid under pressure to cylinder 36 and piston 39. This system includes a sump or tank 85 connected to a suitable pump 86 by pipe 87, pump 86 being driven by any suitable means such as an electric motor 88. Fluid under pressure is delivered from pump 86 into pipe 89, a suitable pressure relief valve 90 being provided to maintain constant the pressure of the fluid delivered by pump 86. Pipe 89 is branched to receive a suitable pressure indicating device 91 and the other branch pipe 92 connects with a suitable high speed by-pass 93 including a valve 94 controlled by cam 72 and follower 73 as described above. A suitable low speed by-pass 95 is provided with a regulating valve 96 included therein. From by-passes 93 and 95 a suitable pipe 97 leads to valve box 59. From valve box 59 a suitable waste pipe 98 leads back to sump 85. Pipes 40 and 41 connect opposite ends of cylinder 36 with valve box 59. Valve box 59 is controlled by lever 63, the central position of lever 63 connecting pipe 97 with pipe 98 so that fluid under pressure is returned to sump 85. When lever 63 is in the left-hand position, as shown, pipe 97 is connected with pipe 40 supplying fluid under pressure to the left-hand end of cylinder 36 to move piston 39 and table 35 to the right. When lever 63 is in the right-hand position, as shown, pipes 97 and 41 are connected so that fluid under pressure is supplied to the right end of cylinder 36 and piston 39 to move piston 39 and table 35 to the left.

In operation, the material to be cut up, as the sheet of valve stems, is placed on the table 35 while the table is at the left end of the frame as viewed in the drawings. Any suitable means may be associated with the table or with the frame to properly align the sheet with the cutting knives so that the latter will cut along the desired lines. The operator then throws the control lever 63 from its neutral or intermediate position, as shown in Fig. 1a, to its left-hand position. This moves the rod 60 to the left, against the tension of the spring 66, withdrawing its inner end from the path of the latch member 69 which drops by gravity onto its stop where it lies in the path of the rod 60, locking the latter in its leftward position. Movement of the lever 63 initiates the operation of the machine and liquid under pressure is admitted through conduit 40 to the left end of cylinder 36 to move the carriage 31 to the right. Table 35 moves the sheet thereon under the knives 20, which are rotated by contact therewith, and the sheet is severed lengthwise by said knives 20.

As the table approaches the end of its movement toward the right, after passing out from under the knives 20, roller 55' is engaged by cam 56 to depress the pin 47 and dispose its flange 48 below the longitudinally extending portion 69 of the latch 67. The withdrawal of the pin 47 from the aperture 45 frees the table, and thereupon a pin 50 on the table engages the bifurcated end of lever 52, whereupon continued movement of the table toward the right as viewed in the drawings causes the table to rotate on its own axis through 90°. As the table reaches the end of its movement toward the right an aperture 45 is aligned with the pin 47, and said pin is moved upwardly by its spring to engage the end of the pin 47 in said aperture, and again lock the table against rotation. Upward movement of the pin 47 causes the flange 48 thereon to engage the latch member 67 and elevate the same, whereupon spring 66 moves rod 60 to the right, throwing control lever 63 to the right, which operates the valve mechanism to admit liquid to the right-hand end of cylinder 36. Thereupon the carriage moves to the left carrying the sheet on the table 36 under the rotatable knives 20, but now the sheet is displaced 90° from the position which it occupied during the forward stroke of the table, and hence the material is cut at right angles to the former lines of severance, and, in the case of the valve stems, the units are cut apart. During both of these strokes the cam plate 72 through operation of the throttling mechanism 80 controls the rate at which the carriage is moved, and as the carriage returns to its initial position it may be stopped manually by throwing the control lever 63 to its central or neutral position or it may be stopped automatically by any suitable mechanism engaged or operated by the movement of the carriage, as for example the extreme portion of the cam 72.

It will therefore be perceived that the present invention provides cutting mechanism which is automatically operated so that an operator need only place the material to be cut on the table 35 and throw the control lever 63. All further operations are predetermined by the machine. The material is cut into strips, the table is rotated through the proper angle, and then the strips are cut into units. In the event that for any reason the table is not moved through the proper angle as it reaches the extremity of its position toward the right, the machine is automatically stopped, because the pin 47 is not aligned with an aperture 45, and therefore its end engages the bottom of the table and prevents upward movement of the pin sufficiently for the flange 48 to lift the latch member 67 out of the path of movement of the rod 60, whereby the machine is not reversed but stopped in its extreme rightward position.

The present invention provides for proper control of the speed of movement of the carriage during its forward and return strokes, and as the cutting operations are formed during both of these strokes, time is conserved and greater efficiency obtained. The machine is particularly simple to operate, and therefore highly skilled labor is not required. It is strong and rugged in character, certain in operation, avoids wear and injury by reason of shocks and jars arising from sudden stoppage or change of speed or direction, and is highly efficient for the purposes and services to be performed.

While the embodiment of the invention illustrated on the drawings has been described with considerable particularity, it is to be expressly understood that the invention is not to be restricted thereto, as the same is capable of receiving a variety of expressions, some of which will now be apparent to those skilled in the art, while changes may be made in the details of construction, arrangement and proportion of parts, certain features may be used without other features, parts may be replaced by equivalent constructions, and by proper adaptation the machine may be employed for cutting a wide variety of materials and along lines having different angular relationships with respect to each other, all without departing from the spirit of the present invention. Other forms of carriage operating means and controls therefor may be used. Reference is therefore to be had to the appended claims for a definition of the invention.

What is claimed is:

1. In a machine for severing material along angularly related lines, the combination of a support for the material to be severed, means for moving said support on forward and return strokes, cutting means disposed in the path of movement of the material on said support and adapted to operate on said material during both forward and return strokes, and means automatically operated at the end of its forward stroke for moving said rotatable support through a predetermined angle.

2. In a machine for severing material along angularly related lines, the combination of a support for the material to be severed, means for moving said support on forward and return strokes, cutting means disposed in the path of movement of the material on said support and adapted to operate on said material during both forward and return strokes, means for moving said support through a predetermined angle at the end of its forward stroke, and means for locking said support against rotation except when moving into cooperative relationship with said last named means.

3. In a machine for severing material along angularly related lines, the combination of a suppport for the material to be severed, means for moving said support on forward and return strokes, cutting means disposed in the path of movement of the material on said support and adapted to operate on said material during both forward and return strokes, means for moving said support through a predetermined angle at the end of its forward stroke, locking means for said support, and means in the path of movement of said support and co-operating with said locking means for withdrawing said locking means from said support as said support approaches said means for rotating said support.

4. In a machine for severing material along angularly related lines, the combination of a support for the material to be severed, means for moving said support on forward and return strokes, cutting means disposed in the path of movement of the material on said support and adapted to operate on said material during both forward and return strokes, means for moving said support through a predetermined angle at the end of its forward stroke, and means for automatically reversing the direction of movement of said support when said support reaches the end of its forward stroke.

5. In a machine for severing material along angularly related lines, the combination of a support for the material to be severed, means for moving said support on forward and return strokes, cutting means disposed in the path of movement of the material during both forward and return strokes, means for moving said support through a predetermined angle at the end of its forward stroke, means for automatically reversing the direction of movement of said support when it reaches the end of its forward stroke, and means whereby said reversing means is inoperative if said support is not rotated through the proper angle.

6. In a machine for severing material along angularly related lines, the combination of a support for the material to be severed, means for moving said support on forward and return strokes, cutting means disposed in the path of movement of the material on said support and adapted to operate on said material during both forward and return strokes, means for moving said support through a predetermined angle at the end of its forward stroke, means for automatically reversing the direction of movement of said support when it reaches the limit of its forward stroke, means for locking said support against rotation except when it approaches said means for rotating said support, and means cooperating with said locking means whereby operation of said reversing means is prevented if said support is not rotated through the proper angle.

7. In a machine for severing material along angularly related lines, the combination of a support for the material to be severed, means for moving said support on forward and return strokes, cutting means disposed in the path of movement of the material on said support and adapted to operate on said material during both forward and return strokes, means for moving said support through a predetermined angle at the end of its forward stroke, and means for automatically varying the speed of movement of said support during both its strokes.

8. In a machine for severing material along angularly related lines, the combination of a support for the material to be severed, means for moving said support on forward and return strokes, cutting means disposed in the path of movement of the material on said support and adapted to operate on said material during both forward and return strokes, means for moving said support through a predetermined angle at the end of its forward stroke, and means for automatically varying the speed of movement of said support during both its strokes, said last named means including a cam mounted on said support, control means, and means cooperating with said cam and operatively connected with said control means for operating the latter to vary the speed of movement of said support.

9. In a machine for severing material along angularly related lines, the combination of a support for the material to be severed, means for moving said support on forward and return strokes, cutting means disposed in the path of movement of the material on said support and adapted to operate on said material during both forward and return strokes, and means for moving said support through a predetermined angle at the end of its forward stroke, said last named means including a plurality of pins on said support and a pivoted arm in the path of movement of a pin on said support for engagement with said arm whereby the thrust of said pin on said arm effects rotation of said support through a predetermined angle.

10. In a machine for severing material along angularly related lines, the combination of a support for the material to be severed, means for moving said support on forward and return strokes, cutting means disposed in the path of movement of the material on said support and adapted to operate on said material during both forward and return strokes, means for moving said support through a predetermined angle at the end of its forward stroke, and means for locking said support against rotation except when said support approaches said last named means, said locking means including a spring pressed pin adapted to engage in any one of a plurality of apertures in said support.

11. In a machine for severing material along angularly related lines, the combination of a support for the material to be severed, means for moving said support on forward and return strokes, cutting means disposed in the path of movement of the material on said support and adapted to operate on said material during both forward and return strokes, means for moving said support through a predetermined angle at the end of its forward stroke, and means for automatically reversing the direction of travel of said support when it reaches the end of its forward stroke, said last named means including a control lever for initiating the operation of the machine, a member operatively connected thereto and moved thereby, a spring tensioned by said movement of said member, a latch movable into the path of movement of said member and means on said support for moving said latch to release said member as said support reaches the end of its forward stroke.

12. In a machine for severing material along angularly related lines, the combination of a support for the material to be severed, means for moving said support on forward and return strokes, cutting means disposed in the path of movement of the material on said support and adapted to operate on said material during both forward and return strokes, means for moving said support through a predetermined angle at the end of its forward stroke, means for locking said support against rotation including a spring pressed pin engageable in any one of a plurality of apertures in said support, and means for withdrawing said pin from its aperture in said support as said support reaches the end of its forward stroke including a projection on said pin and a cam in the path of movement of said projection for engaging said projection and withdrawing said pin.

13. In a machine for severing material along angularly relates lines, the combination of a support for the material to be severed, means for moving said support on forward and return strokes, cutting means disposed in the path of movement of the material on said support and adapted to operate on said material during both forward and return strokes, means for moving said support through a predetermined angle at the end of its forward stroke, means for automatically reversing the direction of travel of said support as it reaches the end of its forward stroke including a control member, a spring pressed member operatively connected therewith and a latch member movable into the path of said last named member, a spring pressed pin for locking said support against rotation except when it approaches the end of its forward stroke, and means on said pin for removing said latch from the path of said spring pressed member when said support has moved through a predetermined angle.

14. In a machine for severing material along angularly related lines, the combination of a support for the material to be severed, means for moving said support on forward and return strokes, cutting means disposed in the path of movement of the material on said support and adapted to operate on said material during both forward and return strokes, means for moving said support through a predetermined angle at the end of its forward stroke, and means for automatically reversing the direction of travel of said support only if said moving means has moved said support through a predetermined angle, said last named means including a spring pressed member, a latch for retaining said member in one position, a locking pin for engagement in apertures in said support and means on said pin for withdrawing said latch member, said last named means being operable only if said locking pin enters an aperture in said support.

15. In a machine for severing material along angularly related lines, the combination of a support for the material to be severed, means for moving said support on forward and return strokes, cutting means disposed in the path of movement of the material on said support and adapted to operate on said material during both forward and return strokes, means for moving said support through a predetermined angle at the end of its forward stroke, and means for automatically reversing the direction of travel of said support when it reaches the end of its forward stroke and operable only if said support has been rotated by said rotating means through a predetermined angle, said last named means including a pin for locking said support against rotation by engagement in any one of a plurality of apertures in said support, means for withdrawing said locking means operated by the forward movement of said support, control means including a spring pressed member, a latch for restraining said spring pressed member, and means on said locking means for co-operation with said latch and adapted to move the same to release said spring pressed member only when said locking means moves into an aperture in said support.

HENRY Z. GORA.